Patented Jan. 24, 1933

1,895,166

UNITED STATES PATENT OFFICE

HERMON B. LAYMON, OF SPENCER, INDIANA

CORN PRODUCT AND METHOD OF MAKING SAME

No Drawing.   Application filed July 1, 1930. Serial No. 465,247.

This invention relates to the art of preparing corn for human consumption and particularly to a new and novel method of preparing shelled corn.

A purpose of the invention is to process corn to form a highly appetizing and nutritious product that may be eaten without further cooking. Another purpose is to prepare corn to be edible and to have an attractive appearance in a form that may be packaged and offered to the public at a comparatively low price. A further object resides in so processing shelled corn as to drive off the moisture content and prevent reabsorption of moisture whereby the processed corn will remain crisp over a long period of time.

In preparing the product, I select a high grade of sweet corn which has been properly cured and cleaned. The corn in this condition resembles high grade seed corn, that is, the grains of corn have matured on the cob and have been shelled, graded as to size and quality and cleaned. I also select a good grade of cocoanut oil and heat it to a temperature of 400 degrees, Fahrenheit, and supply sufficient heat to maintain the body of oil at that temperature.

Now with the temperature of the oil reading approximately 400 degrees F., a reasonably small quantity of the selected sweet corn is placed in the oil, (about six to eight pounds of corn to three to four gallons of oil) the temperature of which will drop to around 325 degrees F., but as the moisture leaves the corn, the temperature will gradually return to 400 degrees F., at which condition the corn is ready to be removed from the oil. The time interval beginning with the immersion of the corn in the oil and ending with the return of the temperature to 400 degrees F. will vary between six and eight minutes.

The corn is removed from the oil at 400 degrees F. temperature and spread out in a thin layer on a draining table and allowed to remain there for about three hours or until the surplus oil has drained off and the remaining oil has hardened on the corn, following which, the corn is placed on a cooling table and there held for a period of two to three hours or until thoroughly cool.

From the cooling table, the corn is placed in mixing bowls or receptacles, and cocoanut oil, heated to a lukewarm temperature, is added to the corn at the rate of one ounce of oil to five pounds of corn. The oil is thoroughly mixed with the corn and pulverized salt is added in the proportion of one-half ounce salt to ten pounds of corn. The corn is agitated for about four minutes to distribute the salt thoroughly over the grains, and the corn is then ready for packing and marketing.

By treating the dry shelled sweet corn in accordance with the above indicated process, a delicious, "crunchy" food article is obtained, very appetizing, and that is finished in a form to seal out moisture to insure crispness over a long period.

I claim:

1. The method of preparing a corn product which includes immersing a quantity of dry shelled uncooked sweet corn in a body of cocoanut oil heated to a temperature of substantially 400 degrees Fahrenheit, removing the corn from the oil after a few minutes time interval, draining excess oil off of the corn, and allowing the corn to cool and the oil to harden on the surface of the corn.

2. The method of preparing a corn product which includes immersing a quantity of dry shelled uncooked sweet corn in a body of cocoanut oil heated to a temperature of substantially 400 degrees Fahrenheit, removing the corn from the oil after a few minutes time interval, draining excess oil off of the corn, and allowing the corn to cool and the oil to harden on the surface of the corn, adding a small quantity of lukewarm cocoanut oil to the cooled corn and mixing salt therewith.

3. The method of preparing a corn product which includes heating a body of cocoanut oil to a temperature of approximately 400 degrees Fahrenheit, immersing a quantity of dry uncooked sweet corn in the oil, holding the corn in the oil until the temperature is restored to 400 degrees F., removing the corn from the body of oil and draining off excess oil, and cooling the corn to harden the oil on the surface of the corn.

In testimony whereof I affix my signature.

HERMON B. LAYMON.